(12) United States Patent
Parks

(10) Patent No.: US 10,962,773 B2
(45) Date of Patent: Mar. 30, 2021

(54) METHOD AND APPARATUS FOR DETERMINING WHETHER AN EYE OF A USER OF A HEAD MOUNTED DISPLAY IS DIRECTED AT A FIXED POINT

(71) Applicant: DisplayLink (UK) Limited, Cambridge (GB)

(72) Inventor: Matthew Parks, Cambridge (GB)

(73) Assignee: DISPLAYLINK (UK) LIMITED, Cambridgeshire (GB)

( * ) Notice: Subject to any disclaimer, the term of this patent is extended or adjusted under 35 U.S.C. 154(b) by 0 days.

(21) Appl. No.: 16/503,759

(22) Filed: Jul. 5, 2019

(65) Prior Publication Data

US 2020/0012096 A1 Jan. 9, 2020

(30) Foreign Application Priority Data

Jul. 6, 2018 (GB) ...................................... 1811167

(51) Int. Cl.
*G02B 27/00* (2006.01)
*G02B 27/01* (2006.01)
*G06F 3/01* (2006.01)

(52) U.S. Cl.
CPC ....... *G02B 27/0093* (2013.01); *G02B 27/017* (2013.01); *G06F 3/012* (2013.01); *G06F 3/013* (2013.01); *G02B 2027/0147* (2013.01)

(58) Field of Classification Search
None
See application file for complete search history.

(56) References Cited

U.S. PATENT DOCUMENTS

| 8,941,561 | B1 | 1/2015 | Starner | |
| 2017/0038831 | A1* | 2/2017 | Vidal | G06F 3/017 |
| 2017/0295373 | A1* | 10/2017 | Zhang | H04N 19/176 |

FOREIGN PATENT DOCUMENTS

| GB | 2556017 A | 5/2018 |
| WO | 2018224841 A1 | 12/2018 |

OTHER PUBLICATIONS

Search Report for Application GB1811167.4, dated Jan. 17, 2019, 4 pages.

* cited by examiner

*Primary Examiner* — Christopher J Kohlman
(74) *Attorney, Agent, or Firm* — Haynes and Boone LLP

(57) ABSTRACT

In virtual-reality display devices it is possible to use head movement as an input to compression, which assumes that the user is looking at something that is moving at approximately the same rate in the same direction as the user's head. This method determines whether an eye of a user of a head mounted display is directed at a relatively fixed point. The method involves detecting (S51) a movement of the user's head, including a lack of movement thereof, determining (S53) a direction of the movement of the user's head, detecting (S52) movement of at least one eye of the user, including a lack of movement thereof, and determining (S54) a direction of the movement of the user's eye. If the directions of movement of the user's head and at the user's eye are different (S55), within a predetermined threshold, it can be assumed that the user's eye is directed at a fixed point (S57), whereas if the directions of movement of the user's head and the user's eye are not different (S55), within a predetermined threshold, then it can be assumed that the user's eye is not directed at a fixed point (S56).

12 Claims, 5 Drawing Sheets

METHOD AND APPARATUS FOR DETERMINING WHETHER AN EYE OF A USER OF A HEAD MOUNTED DISPLAY IS DIRECTED AT A FIXED POINT

CROSS-REFERENCE TO RELATED APPLICATIONS

This application claims priority to GB Application No. 1811167.4, filed on Jul. 6, 2018.

BACKGROUND

Virtual reality is becoming an increasingly popular display method, especially for computer gaming but also in other applications. This introduces new problems in the generation and display of image data as virtual reality devices must have extremely fast and high-resolution displays to create an illusion of reality. This means that a very large volume of data must be transmitted to the device from any connected host.

As virtual-reality display devices become more popular, it is also becoming desirable for them to be wirelessly connected to their hosts. This introduces considerable problems with the transmission of the large volume of display data required, as wireless connections commonly have very limited bandwidth. It is therefore desirable for as much compression to be applied to the display data as possible without affecting its quality, as reductions in quality are likely to be noticed by a user.

It is possible to use head movement as an input to compression, such that when the user's head is moving, the compression level is increased as loss of detail will be less noticeable. However, this assumes that the user is looking at something that is moving at approximately the same rate in the same direction as the user's head. If not, then the increased loss of detail may become quite noticeable, which is undesirable for the user.

The invention seeks to mitigate this problem.

SUMMARY

Accordingly, in a first aspect the invention provides a method of determining whether an eye of a user of a head mounted display is directed at a relatively fixed point, the method comprising:

detecting a movement of the user's head, including a lack of movement thereof;

determining a direction of the movement of the user's head;

detecting movement of at least one eye of the user, including a lack of movement thereof;

determining a direction of the movement of the user's eye;

if the directions of movement of the user's head and at the user's eye are different, within a predetermined threshold, determining that the user's eye is directed at a fixed point; and if the directions of movement of the user's head and the user's eye are not different, within a predetermined threshold, determining that the user's eye is not directed at a fixed point.

In an embodiment, detecting a movement of the user's head comprises sensing movement of the head mounted display. Sensing movement of the head mounted display preferably comprises receiving data from an accelerometer mounted on the head mounted display.

In an embodiment, detecting a movement of the user's eye comprises sensing movement of at least part of the user's eye. Sensing movement of at least part of the user's eye preferably comprises receiving data from a sensor mounted on the head mounted display.

Preferably, if it is determined that the user's eye is directed at a fixed point, transmitting an indication that the user's eye is directed at a fixed point to a host device generating image data for display on the head mounted display.

Preferably, if it is determined that the user's eye is not directed at a fixed point, transmitting an indication that the user's eye is not directed at a fixed point to a host device generating image data for display on the head mounted display.

In response to the determination that the user's eye is directed at a fixed point, an amount of compression applied to image data to be sent to the head mounted display may be decreased.

In response to the determination that the user's eye is not directed at a fixed point, an amount of compression applied to image data to be sent to the head mounted display may be increased.

In an embodiment, the method further comprises: receiving, at the host device, the indication that the user's eye is directed at a fixed point; and in response to receiving the indication that the user's eye is directed at a fixed point, decreasing, at the host device, an amount of compression applied to image data to be sent to the head mounted display.

In an embodiment, the method further comprises:
receiving, at the host device, the indication that the user's eye is not directed at a fixed point; and
in response to receiving the indication that the user's eye is not directed at a fixed point, increasing, at the host device, an amount of compression applied to image data to be sent to the head mounted display.

According to a second aspect, the invention provides a head mounted display comprising:
at least one display for displaying image data to a user;
a sensor for detecting movement of the head mounted display, when it is mounted on a head of the user;
a sensor for detecting movement of an eye of the user, when the head mounted display is mounted on the head of the user;
wherein the head mounted display is configured to perform a method as described above.

According to a third aspect, the invention provides a system comprising:
a head mounted display as described above; and
a host device configured to perform a method as described above.

According to a further aspect, the invention provides a method of determining whether a user's gaze is fixed on a point when moving his or her head in a system incorporating head-movement and eye-movement tracking, comprising:
1. Detecting movement of the user's head;
2. Determining the direction and velocity of the movement;
3. Detecting movement of one or both of the user's eyes;
4. Determining the direction of rotation of the user's head and eyes;
5. If the directions of rotation of the user's head and eyes are different, the user's gaze is fixed on a point. Otherwise it is not.

The difference in rotation may be detected by comparing the angular velocity of a fixed point on the eye, such as the centre of the pupil, with the angular velocity of a fixed point on the head, such as a sensor on a head-mounted device. Alternatively, a simpler method could be used such as simply comparing the direction of movement of the eye with the direction of movement of the head over a short time.

The result of the determination may be used as an input to a compression algorithm in a display system, for example in order to control the application of movement-based compression. In such an embodiment, in a conventional system if fast movement of, for example, a virtual-reality headset is detected the compression algorithm might produce lower-quality image data for display on the grounds that the fast motion will make it difficult for the user to perceive detail. However, embodiments of the invention can provide finer control by providing a method by which the compression algorithm can detect if the user's gaze is focussed on a specific object in the images displayed by the headset. If so, this object should be displayed at high quality.

Some current eye-tracking techniques rely on detecting the actual point of focus of the user's gaze. Embodiments of this invention provide a simpler method which simply detects movement and determines the nature of the user's focus from that movement. It is therefore cheaper and simpler to implement than complex analysis.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
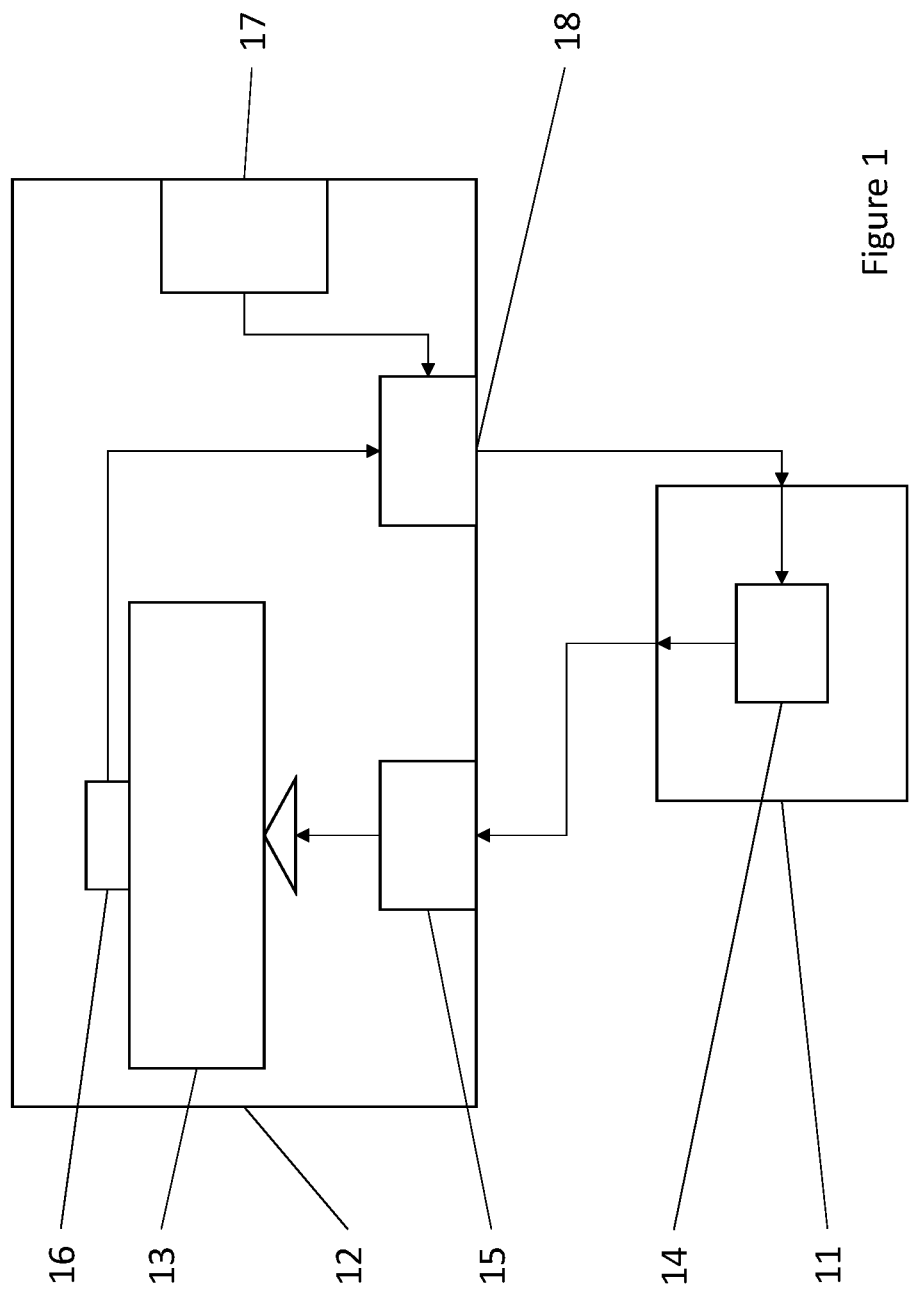
FIG. 1 shows a block diagram of a system according to one embodiment of the invention.

FIG. 1 shows a block diagram of a system that could be used in an embodiment of the invention, comprising a head-mounted display device [12] connected to a host computing device [11]. The host computing device [11] includes, among other components which are not shown here, an application generator [14] which generates display data for display on a display panel [13] of the head-mounted display device [12]. The application generator [14] has two connections to the head-mounted display device [12], of which one is used for transmitting display data and the other is used for receiving data from the head-mounted display device [12] for use when generating display data.

The head-mounted display device [12] includes a data receiver [15] and a data transmitter [18], which control the two connections to the host computing device [11]. The data receiver [15] is connected to an integral display panel [13] and passes received display data to this panel [13] for display. If the application generator [14] produced compressed display data, the data receiver [15] may also decompress the received data prior to sending it for display. The data receiver [15] is connected to two sets of sensors: the first sensor [16] is an eye-tracking sensor which determines movements of a user's eyes and point of focus by, for example, measuring the position of a point of reference such as the centre of the user's pupil. The other sensors [17], which may include an accelerometer, detect, among other things, movement of the head-mounted display device [12] as the user moves his or her head when the head-mounted display device [12] is in use.

Figure 2:
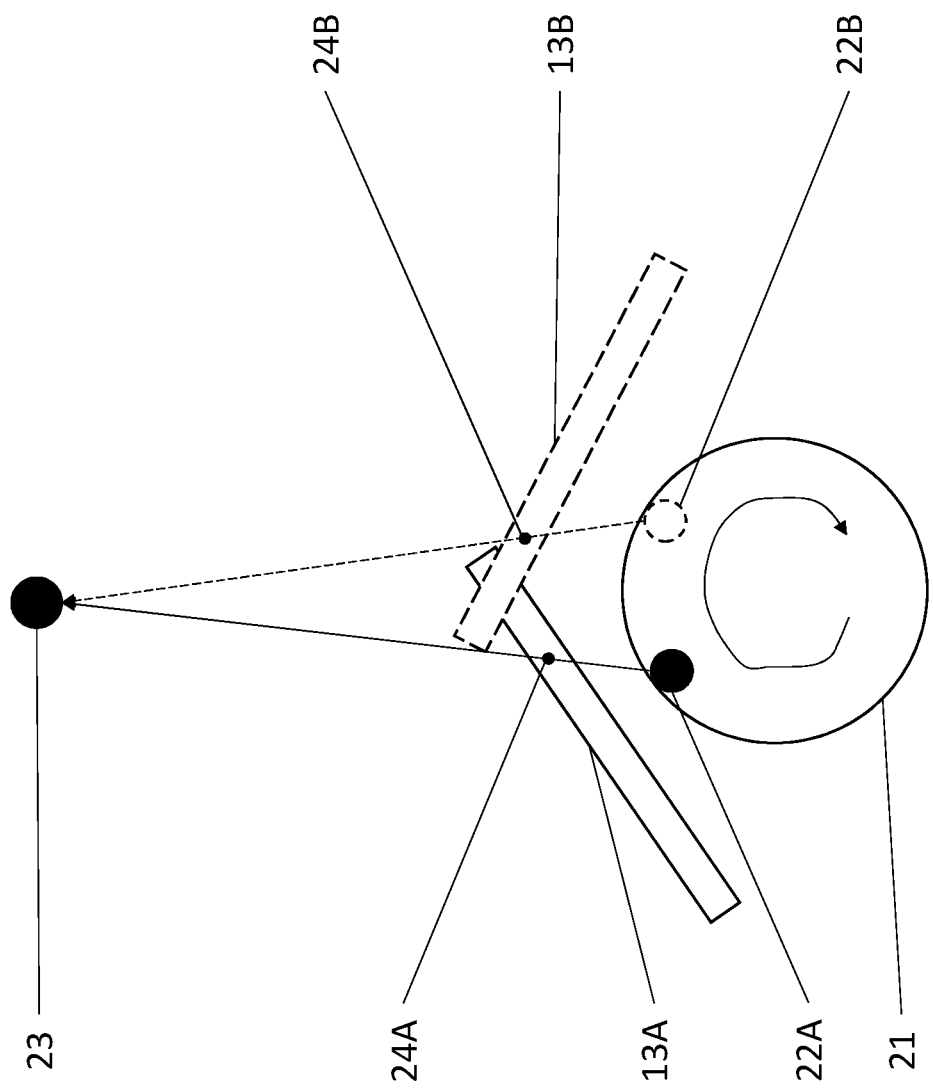
FIG. 2 shows a diagram of a user's gaze focussed on a fixed point.

FIG. 2 shows an example of how the user's gaze may be directed on a fixed point [23]. It will be appreciated that the fixed point may be within a virtual world displayed on the display panel [13], perhaps at a "far distance" in the virtual world, or an object in the virtual world that may be moving in the opposite direction to the movement of the user's head. The user's gaze may even be directed to a point not related to the movement of the head-mounted display device [12] at all. The point [23] on which the user's gaze is directed is represented by a black circle [23] pictured at the top of the Figure, and the direction of the user's gaze in the first instance is represented by a solid arrow connecting the point [23] with the user's eye [22A], represented by a second black circle [22A].

The point [23] will appear on one side of the display panel [13], which is represented in the first instance by a rectangle with a solid outline [13A].

When the user turns his or her head [21], as indicated by the circular arrow, the display panel [13] of the head-mounted display device [12] will also move in accordance with that rotation and will then be in the position indicated by the rectangle with a dashed outline [13B]. The user's eye [22] will naturally also change its location in accordance with the rotation of the user's head [21], to the location indicated by the circle with a dashed outline [22B].

The point [23] may be part of the virtual world displayed by the display panel [13] and may not move within that virtual world. In order to correctly represent this, the image [24] of that point [23] moves from a first position [24A] to a new position [24B] on the display panel [13] and the direction of the user's gaze changes, as represented by the dashed arrow connecting the user's eye [22B] in the new position to the point [23].

Figure 3:
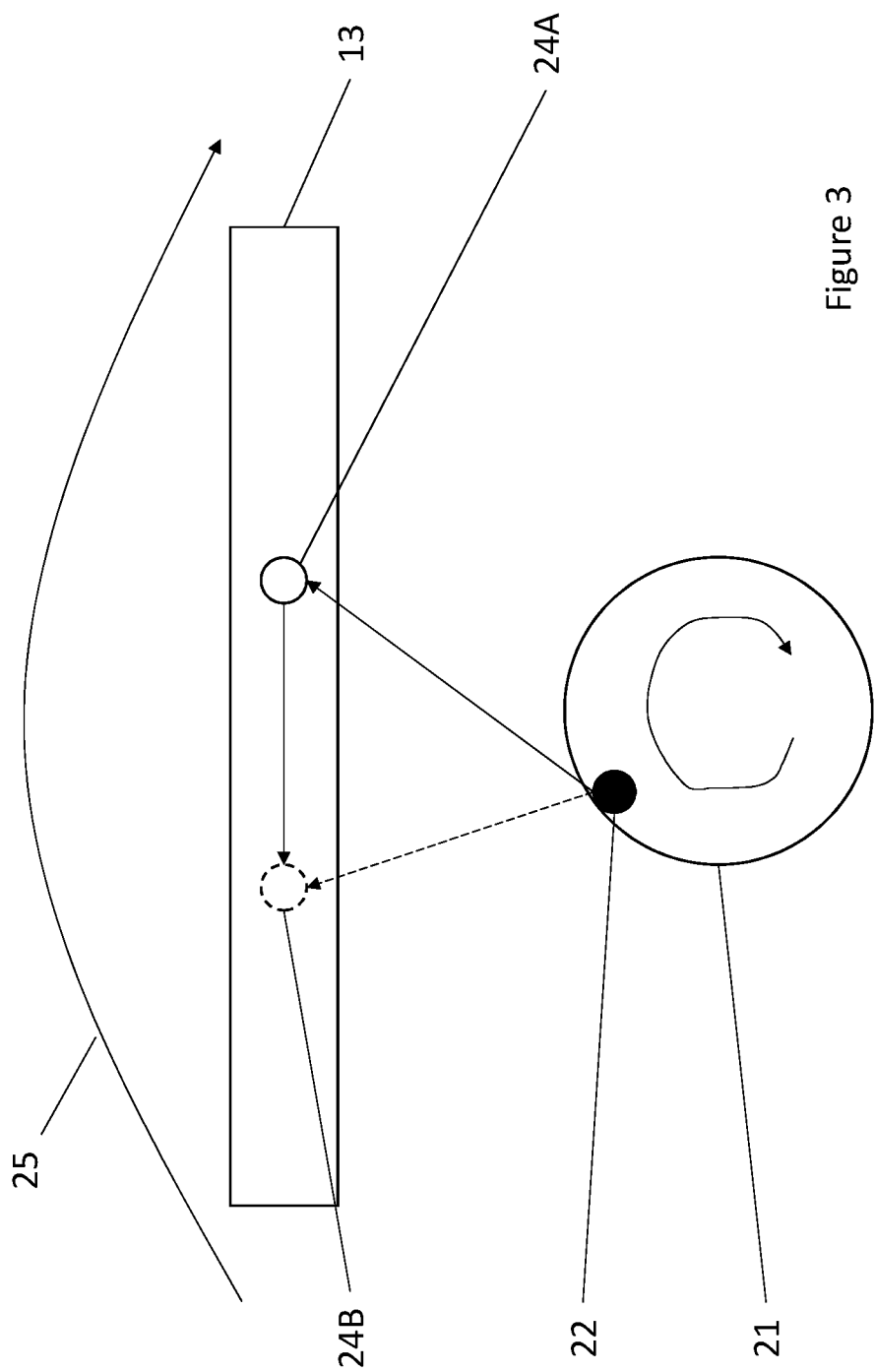
FIG. 3 shows more detail of the diagram of FIG. 2 including movement of a point on a display panel.

The movement of the image [24] of the point [23] is shown more clearly in FIG. 3.

FIG. 3 shows an alternative view of the movement of the user's head [21] and the head-mounted display device [12]. This view presents the head [21] and the head-mounted display device [12] as static and shows the movement of the image [24] of the point [23] on the display panel [13].

Accordingly, as in FIG. 2, the user's head [21] is represented as a circle with the position of his or her eye [22] indicated by a black circle, while the display panel [13] is represented as a rectangle in front of the user's head [21]. The initial location of the image [24] on the display panel [13] is represented by a circle [24A], while the location of the image [24] on the display panel [13] after the movement of the user's head [21] and the head-mounted display device [12] is represented by a circle with a dashed outline [24B]. Likewise, the direction of the user's gaze is indicated by a solid arrow in the first instance and a dashed arrow in the second instance.

When the user turns his or her head [21] in the direction indicated by the circular arrow, the head-mounted display device [12], and therefore the display panel [13], moves in the direction indicated by the curved arrow [25]. However, as suggested in FIG. 2, the image [24] of the point [23] of the user's focus on the display panel [13] moves in the opposite direction to the movement of the head-mounted display device [12] so it moves across the user's field of vision as the user turns his or her head [21]. In this example, the head-mounted display device [12] moves to the right while the image [24] of the point [23] moves to the left.

Figure 4:
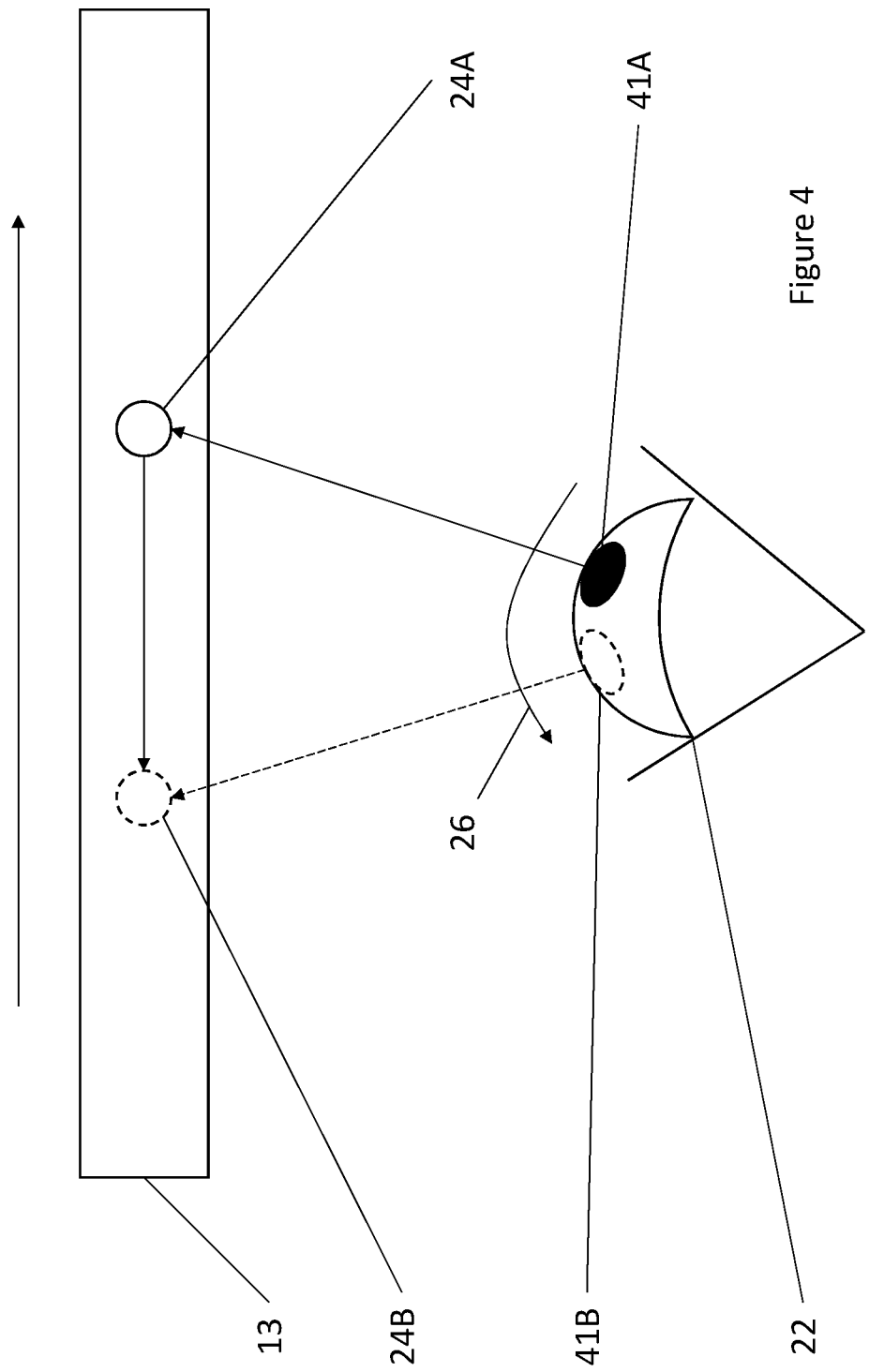
FIG. 4 shows more detail of the diagram of FIG. 3 including rotation of a user's eyeball.

FIG. 4 shows a more detailed view of the movement of the user's eye [22] when the user moves his or her head [21] while remaining focussed on a specific object in the virtual world as described in FIGS. 2 and 3. As before, the display panel [13] in the head-mounted display device [12] is represented by a rectangle and, as in FIG. 3, the first location of the image—and therefore the user's point of focus—is represented by a circle with a solid outline [24A] and the second location is represented by a circle with a dashed outline [24B], while the direction of the user's gaze at first is represented by a solid arrow and the direction of the user's gaze after the movement is represented by a dashed arrow.

As is suggested by the movement of the direction of the user's gaze, the user's eye [22] will rotate in order to follow the movement of the image [24] of the point [23]. This movement is represented by a curved arrow [26] and also by a change in position of the user's pupil [41]: the first location [41A] is represented by a solid black oval [41A] and the second location [41B] is represented by an oval with a dashed outline [41B].

The movement of the display panel [13], the image of the point of focus [24] and the user's eye [22] are all represented by arrows, and it can be seen that the user's eye [22] will move in the opposite direction to the display panel [13].

Figure 5:
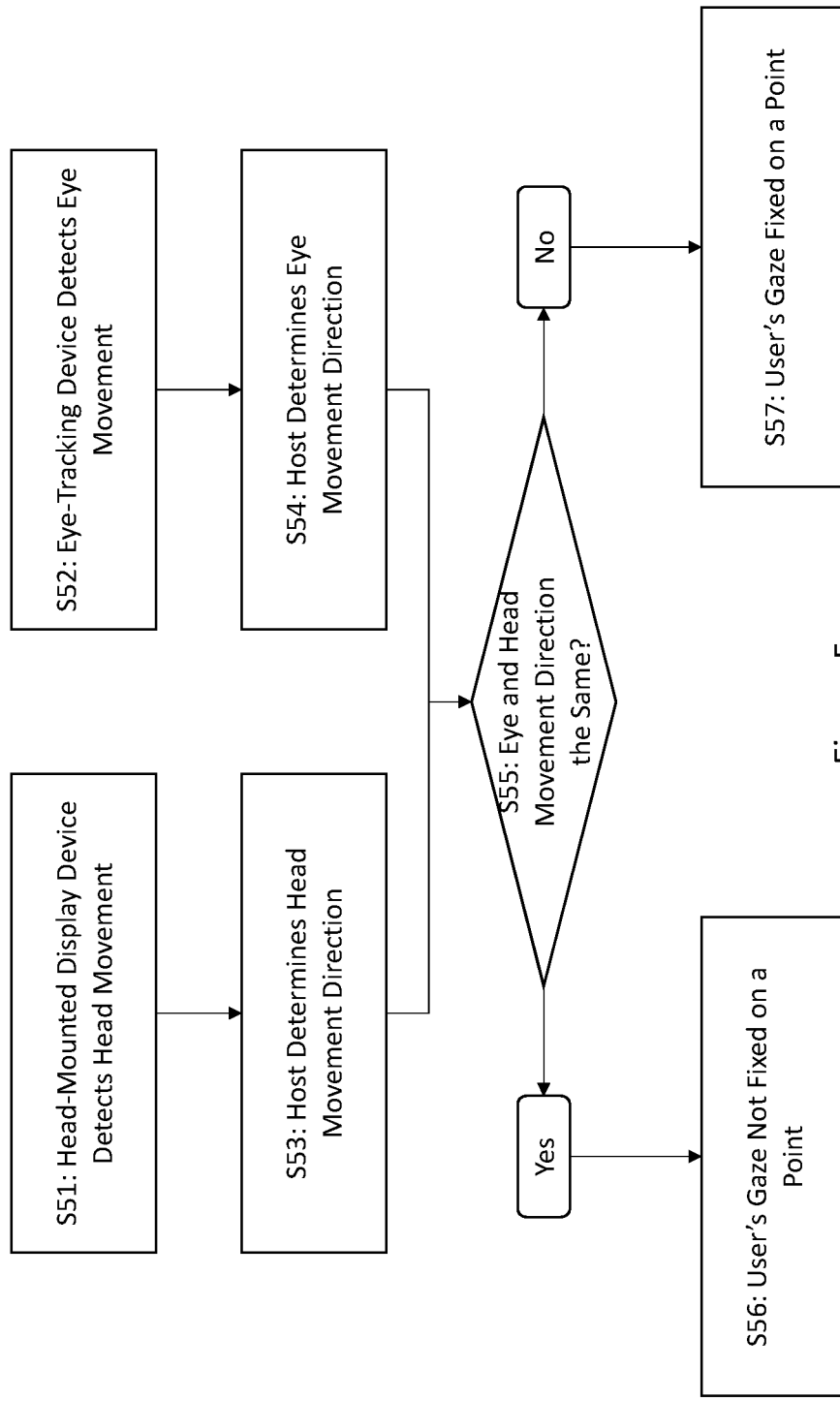
FIG. 5 shows flow diagram of a process according to an embodiment of the invention.

FIG. 5 shows an example process of an embodiment of the invention. The first two branches, beginning at Step S51 and S52 are likely to occur simultaneously, but will be described separately herein for clarity.

At Step S51, the user moves his or her head [21] while wearing the head-mounted display device [12] and therefore the sensors [17] on the head-mounted display device [12] detect the movement. They then transmit data indicating the movement to the host computing device [11] according to the normal operation of a head-mounted display device [12], since as well as the methods of the invention the sensor data is used by the application [14] in creating display data for display on the head-mounted display device [12].

At Step S53, the host computing device [11] determines the direction of movement of the head-mounted display device [12] using the sensor data provided by the head-mounted display device [12]. This analysis may in fact be carried out on the head-mounted display device [12] and the result transmitted to the host computing device [11], but in either case the result will be the host computing device [11] determining the direction of movement.

Meanwhile, at Step S52 an eye-tracking device [16] on the head-mounted display device [12] detects movement of the user's eyes [22] during the movement of his or her head [21]. This data is also transmitted to the host computing device [11] and may be used in, for example, foveal compression, but the host computing device [11] also determines the direction of the user's eye movement at Step S54. Similarly to the case for head movement, the head-mounted display device [12] may determine the direction of movement of the user's eyes [22] locally and transmit this information to the host computing device [11], but the end result will be much the same.

The eye-tracking device [16] may also determine that while the user's head [21] has moved the user's eyes [22] have not moved relative to his or her head [21]. For the purposes of this description, lack of movement will be treated as movement in the same direction as the user's head [21], and lack of movement of the user's head [21] will be treated as movement in the opposite direction to the user's eyes [22].

At Step S55, the host computing device [11] determines whether the directions of movement of the user's head [21] and eyes [22] are the same, within a predetermined threshold, i.e., if the user's eyes [22] rotate to the right or remain still while the user's head [21] moves to the right, the directions are the same, but if the user's eyes [22] rotate to the left while the user's head [21] moves to the right, the directions are not the same.

If the directions are the same, the process follows the branch to the left, beginning at "Yes", and at Step S56 the host computing device [11] determines that the user's gaze is not fixed on a point. It may therefore, for example, apply increased compression that will reduce detail in the image while the movement continues.

If the directions are not the same, the process follows the branch to the right, beginning at "No", and at Step S57 the host computing device [11] determines that the user's gaze is fixed on a point, as explained in FIGS. 2, 3, and 4. The host computing device [11] may therefore retain the details of the display data during compression while the movement is ongoing, on the grounds that since the user is paying attention to an object [23] in the image he or she will notice any degradation in quality. Furthermore, the host computing device [11] may use eye-tracking data to determine the object on which the user's gaze is focussed and only retain the details of that object.

Information on whether the user's gaze is fixed on a point may also be used for other applications, such as the collection of telemetry or triggering content that otherwise might not be worthwhile. For example, if the system is able to detect that the user's gaze is fixed on a moving object the host computing device [11] could add additional detail when otherwise it would generate the moving object at a low level of detail to take into account the fact that it is moving. Similarly, it could be used for a game or navigation mechanic based around retaining focus on a moving object. In both these cases, the movement of the head-mounted display device [12] acts as an additional input to provide a better measure of whether a user is actively tracking a point rather than merely glancing at it.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of determining whether an eye of a user of a virtual reality head mounted display is directed at a relatively fixed point of an image displayed on the virtual reality head mounted display, the method comprising:

detecting a movement of the user's head, including a lack of movement thereof;

determining a direction of the movement of the user's head;

detecting movement of at least one eye of the user, including a lack of movement thereof;

determining a direction of the movement of the user's eye;

in response to determining that the directions of movement of the user's head and the user's eye are different, within a predetermined threshold, determining that the user's eye is directed at a fixed point of the image displayed on the virtual reality head mounted display;

in response to determining that the user's eye is directed at a fixed point of the image displayed on the virtual reality head mounted display, decreasing an amount of compression applied to at least image data to be displayed at the fixed point of the image displayed on the virtual reality head mounted display;

in response to determining that the directions of movement of the user's head and the user's eye are not different, within a predetermined threshold, determining that the user's eye is not directed at a fixed point of the image displayed on the virtual reality head mounted display; and in response to determining that the user's eye is not directed at a fixed point of the image displayed on the virtual reality head mounted display, increasing an amount of compression applied to at least image data to be displayed at the fixed point of the image displayed on the virtual reality head mounted display.

2. The method of claim 1, wherein detecting a movement of the user's head comprises sensing movement of the virtual reality head mounted display.

3. The method of claim 2, wherein sensing movement of the virtual reality head mounted display comprises receiving data from an accelerometer mounted on the virtual reality head mounted display.

4. The method of claim 1, wherein detecting a movement of the user's eye comprises sensing movement of at least part of the user's eye.

5. The method of claim 4, wherein sensing movement of at least part of the user's eye comprises receiving data from a sensor mounted on the head mounted display.

6. The method of claim 1, further comprising, in response to determining that the user's eye is directed at a fixed point of the image displayed on the virtual reality head mounted display, transmitting an indication that the user's eye is directed at a fixed point of the image displayed on the virtual reality head mounted display to a host device generating image data for the image displayed on the head mounted display.

7. The method of claim 6, further comprising:

receiving, at the host device, the indication that the user's eye is directed at a fixed point; and in response to receiving the indication that the user's eye is directed at a fixed point, decreasing, at the host device, an amount of compression applied to at least image data to be sent to the virtual reality head mounted display to be displayed at the fixed point of the image displayed on the virtual reality head mounted display.

8. The method of claim 1, further comprising, in response to determining that the user's eye is not directed at a fixed point of the image displayed on the virtual reality head mounted display, transmitting an indication that the user's eye is not directed at a fixed point of the image displayed on the virtual reality head mounted display to a host device generating image data for the image displayed on the head mounted display.

9. The method of claim 8, further comprising:

receiving, at the host device, the indication that the user's eye is not directed at a fixed point; and in response to receiving the indication that the user's eye is not directed at a fixed point, increasing, at the host device, an amount of compression applied to at least image data to be sent to the virtual reality head mounted display to be displayed at the fixed point of the image displayed on the virtual reality head mounted display.

10. A system comprising:

a virtual reality head mounted display comprising:

at least one display configured to display an image to a user;

a first sensor for detecting movement of the virtual reality head mounted display, including a lack of movement thereof, when it is mounted on a head of the user, indicating movement of the user's head;

a second sensor for detecting movement of at least one eye of the user, including a lack of movement thereof, when the virtual reality head mounted display is mounted on the head of the user;

a data transmitter configured to transmit data indicating the detected movement of the virtual reality head mounted display and data indicating the detected movement of the eye of the user; and a host device comprising:

an image generator configured to generate image data to be used to form the image to be displayed on the at least one display;

a processor configured to:

receive the information indicating the detected movement of the virtual reality head mounted display indicating movement of the user's head;

determine a direction of the movement of the user's head;

receive the information indicating the detected movement of the at least one eye of the user;

determine a direction of the movement of the user's eye;

in response to a determination that the directions of movement of the user's head and the user's eye are different, within a predetermined threshold, determine that the user's eye is directed at a fixed point of the image displayed on the at least one display;

in response to a determination that the user's eye is directed at a fixed point of the image displayed on the at least one display, decrease an amount of compression applied to at least image data to be displayed at the fixed point of the image displayed on the at least one display;

in response to a determination that the directions of movement of the user's head and the user's eye are not different, within a predetermined threshold, determine that the user's eye is not directed at a fixed point of the image displayed on the at least one display; and in response to a determination that the user's eye is not directed at a fixed point of the image displayed on the at least one display, increase an amount of compression applied to at least image data to be displayed at the fixed point of the image displayed on the at least one display.

11. The system of claim 10, wherein the first sensor comprises an accelerometer.

12. The system of claim 10, wherein the second sensor comprises an eye-tracking sensor.

* * * * *